(12) United States Patent
Kline et al.

(10) Patent No.: US 12,550,925 B2
(45) Date of Patent: Feb. 17, 2026

(54) INFANT NUTRITION WITH HYDROLYZED PROTEIN, IONIC CALCIUM AND PALMITIC ACID

(71) Applicant: SOCIÉTÉ DES PRODUITS NESTLÉ S.A., Vevey (CH)

(72) Inventors: Randi Kline, Malvern, PA (US); Jonathan O'Regan, Cork (IE)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/533,918

(22) Filed: Dec. 8, 2023

(65) Prior Publication Data

US 2024/0108050 A1 Apr. 4, 2024

Related U.S. Application Data

(62) Division of application No. 15/536,828, filed as application No. PCT/EP2015/080358 on Dec. 17, 2015, now Pat. No. 11,877,587.

(60) Provisional application No. 62/094,183, filed on Dec. 19, 2014.

(51) Int. Cl.
| | | |
|---|---|---|
| *A23L 33/00* | (2016.01) | |
| *A23L 33/115* | (2016.01) | |
| *A23L 33/16* | (2016.01) | |
| *A23L 33/18* | (2016.01) | |

(52) U.S. Cl.
CPC .............. *A23L 33/40* (2016.08); *A23L 33/115* (2016.08); *A23L 33/16* (2016.08); *A23L 33/18* (2016.08); *A23V 2002/00* (2013.01); *A23V 2250/54252* (2013.01)

(58) Field of Classification Search
CPC ....................................................... A23L 33/40
See application file for complete search history.

(56) References Cited

U.S. PATENT DOCUMENTS

| | | | |
|---|---|---|---|
| 8,076,313 B2 | 12/2011 | Speelmans et al. | |
| 2003/0072865 A1 | 4/2003 | Bindels et al. | |
| 2015/0250220 A1 * | 9/2015 | Banavara ................ | A23L 33/40 426/2 |

FOREIGN PATENT DOCUMENTS

| | | | | |
|---|---|---|---|---|
| DE | 102007022694 | | 11/2008 | |
| EP | 2143340 | | 1/2010 | |
| WO | 9426855 | | 11/1994 | |
| WO | WO-2005051091 A1 * | | 6/2005 | ............ A23D 9/013 |
| WO | 2006114791 | | 11/2006 | |
| WO | 2007088160 | | 8/2007 | |
| WO | 2009016632 | | 2/2009 | |
| WO | WO-2010003790 A1 * | | 1/2010 | ............... A61P 3/02 |
| WO | 2011135564 | | 11/2011 | |

OTHER PUBLICATIONS

Demott, B.J., "Ionic Calcium in Milk and Whey", J. Dairy Science, vol. 51, No. 7, 1968, pp. 1008-1012. (Year: 1968).*
Schmelzle et al., "Randomized Double-Blind Study of the Nutritional Efficacy and Bifidogenicity of a New Infant Formula Containing Partially Hydrolyzed Protein, a High Beta-Palmitic Acid Level, and Nondigestible Oligosaccharides", Journal of Pediatric Gastroenterology and Nutrition, vol. 36, Mar. 2003, pp. 343-351.
"Nutricia Product Information for Infant Nutrition", 2006, 10 pages.
"Infant Nutrition Product Information", 2003, 15 pages.
Savino et al., "Reduction of Crying Episodes Owing to Infantile Colic: A Randomized Controlled Study on the Efficacy of a New Infant Formula", European Journal of Clinical Nutrition, vol. 60, May 31, 2006, pp. 1304-1310.
Savino et al., ""Minor" Feeding Problems During the First Months of Life: Effect of a Partially Hydrolysed Milk Formula Containing Fructo- and Galacto-Oligosaccharides", Acta Paediatr Suppl, vol. 441, 2003, pp. 86-90.
Guadix et al., "Production of Whey Protein Hydrolysates with Reduced Allergenicity in a Stable Membrane Reactor", Journal of Food Engineering, vol. 72, 2006, pp. 398-405.
"Whey Protein Concentrate Nutrition Facts", Nutrition Data, Oct. 7, 2020, 2 pages.
Veitl et al., "Akzeptanz, Toleranz und Wirksamkeit Von Milupa Comformil Bei Sauglingen Mit Kleineren Ernahrungs- und Verdauungsproblennen", J Ernahrungsmed, vol. 2, Issue No. 4, Apr. 2000, pp. 14-20.
Innis et al., "Evidence that Palmitic Acid is Absorbed as Sn-2 Monoacylglycerol from Human Milk by Breast-Fed Infants", Lipids, vol. 29, Issue No. 8, 1994, pp. 541-545.
Scott, "Structured Lipid—A Functional Ingredient to Closely Match Infant Formula to Breast Milk", Nutra Foods, vol. 9, Issue No. 3, 2010, pp. 7-13.
Lien et al., "The Effect of Triglyceride Positional Distribution on Fatty Acid Absorption in Rats", Journal of Pediatric Gastroenterology & Nutrition, vol. 25, Aug. 1997, 22 pages.
Permyakov et al., "Calcium Binding Proteins", 2011, pp. 392-393.
Notice of Opposition Received for Application No. EP15816748.6, mailed on Oct. 14, 2020, 17 pages.
"Standard for Infant Formula and Formulas for Special Medical Purposes Intended for Infants", Codex Alimentarius, Codex Stan 72-1981, 17 Pages.
Rutherford, "Methodology for Determining Degree of Hydrolysis of Proteins in Hydrolysates: A Review", Journal of AOAC International, vol. 93, Issue No. 5, 2010, pp. 1515-1522.

(Continued)

*Primary Examiner* — Elizabeth Gwartney
(74) *Attorney, Agent, or Firm* — K&L Gates LLP

(57) ABSTRACT

The present invention relates to a composition for use in formulae for infants or young children comprising partially hydrolysed protein, ionic calcium and an oil mix comprising palmitic acid esterified to triacylglycerols wherein the palmitic acids esterified in the sn-2 position of triacylglycerols in an amount of at least 20% by weight of total palmitic acid. Furthermore, the invention relates to an infant formula comprising said composition and the use of said composition or infant formula.

19 Claims, No Drawings

(56) References Cited

OTHER PUBLICATIONS

Mihatsch et al., "Hydrolysed Protein Accelerates the Gastrointestinal Transport of Formula in Preterm Infants" ACTA Paediatrica, vol. 90, Issue No. 2, 2001, pp. 196-198.

Vandenplas et al., "When Should We use Partially Hydrolysed Formulae for Frequent Gastrointestinal Symptoms and Allergy Prevention?", ACTA Paediatrica, vol. 103, Issue No. 7, 2014, pp. 689-695.

Litmanovitz et al., "Reduced Crying in Term Infants Fed High Beta-Palmitate Formula: A Double-Blind Randomized Clinical Trial", BioMed Central Pediatrics, vol. 14(1) : 152, 2014, pp. 1-6.

Kennedy et al., "Double-Blind, Randomized Trial of a Synthetic Triacylglycerol in Formula-Fed Term Infants: Effects on Stool Biochemistry, Stool Characteristics, and Bone Mineralization", The American Journal of Clinical Nutrition, vol. 70, Issue No. 5, 1999, pp. 920-927.

Souci et al., "Food Compositions and Nutrition Tables", 2008, pp. 64-65.

European Commission, Scientific Committee on Food, "Report of the Scientific Committee on Food on the Revision of Essential Requirements of Infant Formulae and Follow-on Formulae", Apr. 4, 2003, 11 pages.

Commission Directive 91/321/EEC, "Infant Formulae and Follow-on Formulae", the Comission of the European Communities, May 19, 1991, 15 pages.

Bongers et al.,"The clinical effect of a new infant formula in term infants with constipation: a double-blind, randomized cross-over trial"—Nutrition Journal, 2007, 6:8, pp. 1-7. (Year: 2007).

* cited by examiner

INFANT NUTRITION WITH HYDROLYZED PROTEIN, IONIC CALCIUM AND PALMITIC ACID

CROSS REFERENCE TO RELATED APPLICATIONS

The present application is a divisional of U.S. patent application Ser. No. 15/536,828 filed Jun. 16, 2017, which is a National Stage of International Application No. PCT/EP2015/080358 filed Dec. 17, 2015, which claims priority to U.S. Provisional Patent Application No. 62/094,183 filed Dec. 19, 2014, the entire contents of which are incorporated herein by reference.

TECHNICAL FIELD OF THE INVENTION

The present invention relates to a composition for use in formulaes for infants or young children comprising partially hydrolysed protein, ionic calcium and an oil mix comprising palmitic acid esterified to triacylglycerols, wherein the palmitic acid comprises palmitic acid esterified in the sn-2 position of triacylglycerols in an amount of at least 20% by weight of total palmitic acid. Furthermore, the invention relates to an infant formula comprising said composition and the use of said composition or infant formula.

BACKGROUND OF THE INVENTION

Mother's milk is recommended for all infants as a sole source of nutrition for up to the age of 4-6 months of age, since human breast milk supplies vital nutrients to infants. However, in some cases breastfeeding is inadequate or unsuccessful or inadvisable for medical reasons, or the mother chooses not to breast feed either at all or for a period of more than a few weeks. Infant formulations have been developed for these situations.

Research into the components of human milk has been going on for many years and it is by no means complete even now. The research however shows that there are differences between the nutrients present in human milk and the ones used in the commercially available infant formulas on the market today. For example, the type of lipid composition can differ significantly. The lipids present in human breast milk contains for example a large amount of palmitic acid esterified on the sn-2 (beta) position of the triacylglycerol, i.e. 68-72% of palmitic acid in human milk is esterified in the sn-2 position. In infant formulas, vegetable oils are typically used as the lipid source. The source of palmitic acid in the infant formulas used today comprises a high amount (i.e. 80%) of palmitic acid esterified in the sn-1(3) (alpha) position of the triacylglycerol.

This difference in oils and fats and in particular the difference in regiospecific distribution of palmitic acid causes a difference in the digestion of fats in infants. Infants fed with infant formulations comprising an oil mix comprising palmitic acid having a high amount of said palmitic acid in the sn-1(3) position of the triacylglycerol have been shown to lead to an increased calcium excretion in the faeces as compared to infants fed with a human breast milk. Palmitic acid in the sn-1 and sn-3 position are most likely to be cleaved and form free fatty acids. Free palmitic acid can bind calcium and form insoluble palmititic acid soaps in the intestine. Excretion of these soaps in the feces may be partially responsible for harder stools experienced by some formula fed infants. Harder stools are a component of functional constipation in infants and young children.

Further, calcium loss in a population such as infants may increase the risk of insufficient bone mineralization.

Some studies are known where infants fed with infant formulas comprising a high relative proportion of sn-2 palmitate, such as more than 66% sn-2 palmitate of total amount of palmitic acid (and lower than 34% sn-1(3) palmitate) were observed to have a significant reduction of calcium excreted in the faeces as compared to the calcium excreted in infants fed with a standard formula. On the contrary, infants fed with an infant formula having a more moderate content of sn-2 palmitate, approximately 44% of total palmitic acid, showed no significant decrease in faecal calcium as compared to infants fed with a standard formula.

In Carnielli et al "*Feeding premature newborn infants with palmitic acid in amounts and stereoisomeric position similar to that of human milk; effects on fat and mineral balance*", Am J Clin Nutr. May 1995 vol. 61 no. 5, page 1037-1042 is disclosed that an infant formula comprising sn-2 palmitates in an amount close to that in human breast milk resulted in a lower calcium excretion as compared to when infants were fed with an infant formula having a high amount of sn-1(3) palmitate.

In Carnielli et al "*Structural position and amount of palmitic acid in infant formulas: effects on fat, fatty acid, and mineral balance*" J. Pediatr Gastroenterol Nitr. 1996, December; 23(5):553-60, is disclosed a study showing that infants fed with an infant formula comprising 24% palmitic acid having 66% esterified in the sn-2 position of triacylglycerol, would have a faecal calcium excretion significantly lower than for infants fed with an infant formula comprising intermediate and low amounts of sn-2 palmitate out of total palmitic acid (24% palmitic acid and 39% esterified in the sn-2 position of triacylglycerol) and (20% palmitic acid having 13% esterified in the sn-2 position of the triacylglycerol).

Furthermore, studies have shown that infant formulations comprising an amount of 36% of total palmitic acid esterified in the sn-2 position of triacylglycerols and lower and thus 64% of palmitic acid esterified in the sn-1(3) position of triacylglycerold and higher, will result in no significant decrease in the faecal calcium excretion.

Thus, the palmitic acid as well as its regiospecific distribution (sn-2 versus sn-1(3)) is important for reduction of calcium excreted in faeces.

However, there is a need in the art for compositions for use in formulaes for infants or young children where the amounts of calcium excreted in stools are even lower and more comparable with the calcium levels excreted by infants fed with human milk.

SUMMARY OF THE INVENTION

Thus, an object of the present invention is to provide a composition for use in formulaes for infants or young children, and in human milk fortifier, which can result in similar low amount of calcium excreted in faeces as when an infant is fed with human breast milk.

In particular, it is an object of the present invention to provide a composition that solves the above mentioned problems of the prior art with calcium excretion and which composition further decrease the amount of calcium excreted by an infant fed with an infant formula.

Thus, one aspect of the invention relates to a composition for use in formulaes for infants or young children comprising partially hydrolysed protein, ionic calcium and an oil mix comprising palmitic acid esterified to triacylglycerol, wherein the palmitic acid comprises palmitic acid esterified in the sn-2 position of triacylglycerol in an amount of at least 20% by weight.

Another aspect of the present invention is to provide an infant formula comprising the composition according to the invention.

Yet another aspect of the present invention relates to the composition or infant formula according to the invention for use in administration to an infant or young child to reduce calcium excretion by said infant or young child.

Still another aspect of the present invention relates to the composition or infant formula according to the invention for use in administration to an infant or young child to increase calcium homeostasis, increase calcium absorption, increase calcium retention, increase calcium utilization and/or reduce the formation of palmitic acid soaps.

In still another aspect, the present invention relates to the composition or infant formula according to the invention for use in administration to an infant or young child to soften stools, prevent and/or reduce the risk of hard stools, prevent and/or reduce the risk of constipation, improve feeding tolerance, decrease the frequency and duration of crying and fussing and alleviate digestive discomfort and colic.

In still another aspect, the present invention relates to the composition or infant formula according to the invention for use in administration to an infant or young child to improve sleep duration, improve sleep quality and quantity, improve infant and parental quality of life and reduce maternal anxiety.

In a further aspect, the present invention relates to the composition or infant formula according to the invention for use in administration to an infant or young child to increase bone mineralization, increase bone strength, and/or increase bone mineral density.

DETAILED DESCRIPTION OF THE INVENTION

Definitions

Prior to discussing the present invention in further details, the following terms and conventions will first be defined:

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9 and so forth. All references to singular characteristics or limitations of the present invention shall include the corresponding plural characteristic or limitation, and vice versa, unless otherwise specified or clearly implied to the contrary by the context in which the reference is made.

In the context of the present invention, the term "ratio" by weight (weight/weight) refers to the ratio between the weights of the mentioned compounds. For example, a mixture comprising 60 g whey and 40 g casein would have a weight ratio which is equal to 60:40, which is equal to 3:2 or 1.5 (that is 3 divided with 2). Similarly, a mixture of 50 g whey and 50 g casein would have a ratio by weight of whey and casein of 50:50, which is equal to 1:1 or 1 (that is 1 divided with 1).

The term "and/or" used in the context of the "X and/or Y" should be interpreted as "X", or "Y", or "X or Y".

As used in this specification, the words "comprising", "comprises" and similar words are not to be interpreted in an exclusive or exhaustive sense. In other words they are intended to mean "including, but not limited to".

Unless defined otherwise, all technical and scientific terms used herein have the same meaning as commonly understood by one of ordinary skill in the art.

The term "infant" will in the context of the present invention mean a child under the age of 12 months.

The term "young child" refers to a child in the age from 12 months to 4 years.

In the context of the present invention, the infant may be any term infant or preterm infant. In an embodiment of the invention, the infant is selected from the group of preterm infants and term infants.

The term "infant formula" as used in the context of the present invention refers to a nutritional composition intended for infants during the first months of life and as defined in Codex Alimentarius, (Codex STAN 72-1981) and Infant Specialities (incl. Food for Special Medical purposes) as defined in Codex Alimentarius, (Codex STAN 72-1981).

The term "follow-on formula" are given to formulas designed to be used from the age of 6 to 12 months of age. The follow-on formula is typically given in combination with the infant is given other types of food, such as vegetable and/or fruit puré.

The term "growing-up milk" is given to formulas designed to be used from the age of one year onwards. It is generally a milk-based beverage adapted for the specific nutritional needs of young children.

The term "composition for use in formulaes for infants or young children" refers in the context of the present invention to either a formula as such, i.e an infant formula, which comprises all nutrients necessary in order to meet the standards of being an infant formula as defined in the Codex Alimentarius. Further, the "composition for use in formulaes for infants or young children" may be a composition comprising nutrients, which together with other compositions of nutrients can be mixed to prepare a formula, i.e. such "composition for use in infant formulation" can be added to a mixture, which is intended to be used as an infant formula. Further, the "composition for use in formulaes" can be a supplement or a fortifier to an infant formula, follow-on formula, growing-up milk or human milk.

Oil Mix:

In the context of the present invention, the term "oil mix" refers to a mixture of vegetable fats and oils, dairy fats and/or animal fats comprising triacylglycerols as the main source of lipids. The oil mix may be a mixture of one or more vegetable oils and fats, for example selected from the group consisting of palm oil, palm kernel oil, esterified vegetable oils, such as inter esterified palm oil, animal fat and animal fat fractions. The oil mix may also comprise other vegetable oils and fats suitable for infant nutrition. For example the oil mix may comprise one or more selected from the group of soybean oil, coconut oil, rapeseed oil, canola oil, sunflower oil, safflower oil and milk fat.

In an aspect of the present invention, the oil mix used comprises palmitic acid, wherein the proportion of palmitic acid esterified in the sn-2 position of triacylglycerol is least 20% by weight of total palmitic acid.

Palmitic Acid:

In the context of the present invention, the term "palmitic acid" refers to the saturated fatty acid, 16:0. The term "palmitate" may also be used for "palmitic acid" when esterified to glycerol such as in triacylglycerols. Most palmitic acid in lipid compositions esterified to triacylglycerols and may be positioned on either the external (sn-1(3)) or internal (sn-2) position of the triacylglycerols. When palmitic acid is esterified in the (external) first or third position of a triacylglycerol, the palmitic acid is in the sn-1(3) position of the triacylglycerol. Such palmitic acid is in the context of the present invention referred to as sn-1(3) palmitate. Palmitic acid esterified in the internal position of a triacylglycerol is a palmitic acid with the position of palmitic acid in the sn-2 position of the triacylglycerol, and such palmitic acid is in the context of the present invention referred to as sn-2 palmitate. The oil mix according to the present invention comprises triacylglycerols and some of the triacylglycerols has palmitic acids esterified.

In the context of the present invention, the term "amount sn-2 palmitic acid" refers to the amount of beta palmitic acid based on total amount of palmitic acid.

Similarly, the term "amount sn-1(3) palmitic acid" refers to the amount of alpha palmitic acid based on total amount palmitic acid.

In an embodiment according to the present invention, the fat blend comprises palmitic acid in an amount of at least 8% by weight of total amount of fatty acids, such as at least 10% by weight, preferably at least 12% by weight, such as at least 15% by weight, even more preferably at least 18% by weight. [Jonathan will get back with the minimum amount]

In a further embodiment according to the present invention, the oil mix comprises palmitic acid in an amount of from 8% to 30% by weight, such as in an amount of from 10 to 26% palmitic acid by weight, preferably in an amount of from 12 to 25% by weight. In particular, the oil mix comprises from 20 to 24% by weight of palmitic acid.

In human milk, more than 98% of fat is in form of triacylglycerols which contain saturated and unsaturated fatty acids. The main saturated fatty acid in human milk is palmitic acid which account for 22-25% of the total amount of fatty acids.

In human milk, about 68-72% of the palmitic acid is esterified in sn-2 position of triacylglycerol.

In palm olein, which is a palm oil fraction widely used in infant formulation comprising a high amount of palmitic acid, the amount of sn-1(3) palmitate is 90-95% and thus only about 5-10% of palmitic acid is esterified in the sn-2 position of triacylglycerols.

In most commercially available infant formulas, the major part, about 80-90% of the palmitic acid present, is esterified in the sn-1(3) position of triacylglycerols, i.e. is present as sn-1(3) palmitate.

However, it has been found out that the position of palmitic acid in triacylglycerols has an influence on the absorption of minerals, such as for example absorption of calcium, because free palmitic acid forms complexes with minerals. When palmitic acid is esterified in the sn-1(3) position of triacylglycerols, free palmitic acid during digestion is released from the triacylglycerol and forms insoluble complexes with minerals such as calcium if sufficiently present in the diet (this is called palmitic acid soaps). These palimitic acid soaps are not absorbable and are therefore lost in the faeces. The loss of palmitic acid soaps leads to mineral loss as well as poor nutrient absorption.

Palmitic acid soaps may be expressed in many ways, for example as calcium soaps, palmitate soaps, calcium-fatty acid complexes or insoluble complexes. These terms may be used interchangeable, but should be understood as the same.

On the contrary, when palmitic acid is esterified in the sn-2 position of the triacylglycerols, unsaturated fatty acids esterified in the sn-1(3) position of the triacylglycerols are released during digestion and well-absorbed, therefore avoiding palmitic acid soap formation. Furthermore, sn-2 palmitate is well-absorbed as monoacylglycerol. Hence, if a large amount of palmitic acid is in the sn-1(3) position of triacylglycerol, a large amount of calcium will be excreted in the faeces. Studies has shown that using an oil mix comprising palmitic acid having an amount of sn-2 palmitate in a high amount, such as in an amount similar to the content in human milk, preferably above 65-70% will result in an decrease in calcium excretion as compared to using oil mixes having lower amounts of sn-2 palmitate.

A high amount of sn-2 palmitate is considered to be an amount of sn-2 palmitate close to the amount present in human milk, i.e. a high amount of sn-2 palmitate is considered to be in the range of 68-80% by weight of total palmitic acid, such as at least above 65% sn-2 palmitate of total palmitic acid.

The inventors of the present invention have surprisingly found out that a combination of an oil mix with palmitic acids, hydrolysed proteins and ionic calcium have a synergistic effect on absorption of calcium when combined with sn-2 palmitate lipids. The inventors have found out that when an oil mix comprising sn-2 palmitates in both moderate amounts, such as about 20-60% by weight, and in higher amounts (65-80%), are digested by an infant or young child in combination with partially hydrolysed protein and ionic calcium, the amounts of calcium excreted in stools are close to the amount excreted by infants fed with human milk.

Thus, one aspect of the present invention is to provide a composition for use in formulaes for infants or young children comprising partially hydrolysed protein, ionic calcium and a oil mix comprising palmitic acid esterified to triacylglycerols, wherein the palmitic acid comprises palmitic acid esterified in the sn-2 position of palmitic acid in an amount of at least 20% by weight of total palmitic acid.

In an embodiment according to the invention, the oil mix comprises sn-2 palmitate in an amount of 2-15% of total fatty acids present in the oil mix and sn-1(3) palmitate in an amount of 5-14% of total fatty acids in the oil mix.

In a further embodiment of the invention, the oil mix comprises palmitic acid, wherein the amount of palmitic acid comprises from 20% to 80% by weight of sn-2 palmitate. In a preferred embodiment, the palmitic acid comprises sn-2 palmitate in an amount of 25% to 75% by weight, such as sn-2 palmitate in an amount of 30% to 70% by weight, preferably sn-2 palmitate in an amount of 35% to 65% by weight.

An oil mix comprising the specific amount of sn-2 palmitate may be prepared by mixing different vegetable oils or by mixing vegetable oils with milk fat. An example of an oil mix could be a mix of cow's milk fat and one or more of vegetable oils, such as sn-2 palmitate, palm oil, coconut oil, soybean oil, high oleic safflower oil and sunflower oil. These fats and oils may be blended in ratios sufficient to provide a similar fatty acid profile to that found in human milk.

A commercially available composition sold by Lipid Nutrition is Betapol™ B-55, which is a triglyceride mixture derived from vegetable oil in which at least 54% of the palmitic acid is in the sn-2 position of the glycerol molecule. In one embodiment, the oil mix present in the composition according to the present invention is a mix of Betapol™ B-55 and other vegetable oils. Those skilled in the art will know that the percentage of the sn-2 palmitic acid used and the total amount of palmitate in the formula may vary, and that a different sn-2 palmitate oil may be used, without departing form the spirit and scope of the invention.

In another embodiment of the invention, the oil mix furthermore comprises stearic acid, i.e. triacylglycerols having stearic acid attached thereto through ester bonds.

Protein:

In an aspect of the invention, the composition comprises a partially hydrolysed protein.

The inventors of the present invention have surprisingly found out that hydrolysed proteins have a positive influence on the calcium absorption and that hydrolysed proteins in combination with palmitic acids can decrease the palmitic acid soap formation and thus decrease the calcium excretion even though the palmitic acids is not all in the sn-2 position. Further, the inventors have found out that ionic calcium in combination with palmitic acid and hydrolysed proteins further minimizes the calcium excretion. It has surprisingly been found that infants fed with a formula comprising partially hydrolysed protein, ionic calcium and triacylglycerols with palmitic acid results in having an excretion of calcium which is lower than infants fed with a high amount of sn-2 palmitate and intact or hydrolysed protein, but are more similar to calcium excreted by infants fed with human milk.

Without being bound by any theory, the inventors of the present invention believes that peptides resulting from hydrolysing a protein may have a less protective effect against proteolysis of digestive enzymes as compared to intact protein. Thus, peptides from protein hydrolysates may not protect the digestive enzyme lipase from proteolysis during digestion while intact proteins will protect lipase. Thus, hydrolysed protein peptides in combination with an oil mix comprising palmitic acid will result in in less release of sn-1(3) palmitic acid by lipase, and thus prevent soap formation and improve calcium absorption.

This effect of hydrolysed proteins on the digestive enzymes are further improved by addition of ionic calcium. Without being bound by any theory, the present inventors believe that ionic calcium form bonds to peptides from hydrolysis of protein. These calcium bound peptides will result in an even poorer protection of lipase, and thus an even further impairing of lipase activity, than made by unbound peptides alone from hydrolysed proteins. Thus, when lipase is less protected, less palmitic acids are released from the sn-1 and sn-3 position of the triglyceride and less calcium soaps are formed. The palmitic acids will maintain bound to the triglyceride and absorbed. As a consequence, more calcium is excreted in the faeces.

In the context of the present invention, the term "protein" refers to one or more proteins.

The protein used in the present invention may be any protein suitable for being administered to infants. The source of protein may for example be one or more selected from the group of whey protein, casein, soybean protein, pea protein, rice protein or protein from legumes. However, it is preferred that the protein source is based on cow's milk proteins such as whey, casein or mixtures thereof.

In an embodiment of the present invention, the protein is a dairy protein and in a preferred embodiment, the protein is a combination of casein and whey protein.

Casein is a dairy protein commonly found in mammalian milk. Casein makes up about 80% of the proteins in cow's milk and about 40% of the proteins in human milk.

Whey protein is a mixture of globular proteins isolated from whey, which is a liquid material made as a by-product under cheese making. Whey proteins makes up about 20% of the proteins in cow's milk, where about 60% of the proteins in human milk is whey proteins.

Whey proteins is typically a mixture of many proteins, for example beta-lactoglobulin, alpha-lactalbumin, lactoferrin and bovine serum albumin and immunoglobulins.

In another preferred embodiment of the invention, the protein is whey protein.

The whey protein may be in the form of for example a whey protein isolate (WPI) or a whey protein concentrate (WPC).

In an aspect of the present invention, the protein is partially hydrolysed protein.

In an embodiment of the present invention, the partially hydrolysed protein is partially hydrolysed whey protein.

The term "hydrolysed protein" refers to protein that has been subjected to hydrolysis to break down the protein into a mixture of peptides and free amino acids. Hydrolysis of proteins is commonly know and can be done by many different methods, for example by enzymatic hydrolysis by using an enzyme such as pancreatic protease to stimulate the naturally occurring hydrolytic process. Hydrolysis may also be by prolonged boiling in a strong acid or a strong base. In the context of the present invention, the partially hydrolysed protein may be produced by any suitable method known in the art. For example, a whey protein hydrolysate may be prepared by enzymatically hydrolyse the whey fraction in two steps as described in EP 0322589 A1. For extensively hydrolysing protein, the whey protein may be subjected to triple hydrolysis using first the enzyme Alcalase 2.4 L (EC 940459), then Neutrase 0.5 L and then pancreatic protease at temperatures about 55° C.

An example of a whey protein hydrolysate which could be used in the present invention is a whey protein hydrolysate comprising about 79% protein and has a degree of hydrolysation being about 13%

In the context of the present invention "partially hydrolysed" refers to proteins, which has been subjected to hydrolysis, where only a portion of the peptide bonds in the protein has been hydrolysed. The partially hydrolysis of protein is measured as the degree of hydrolysis.

The term "degree of hydrolysis" of a protein refers to the number of peptide bonds in the intact protein which are cleaved during the hydrolysis divided by the number of peptide bonds in the intact protein expressed as a percentage.

The term "intact" means in the context of the present invention, proteins where the molecular structure of the protein(s) is not altered according to the conventional meaning of intact proteins. By the term "intact" is meant that the main part of the proteins are intact, i.e. the molecular structure is not altered, for example at least 95% of the proteins are not altered, such as at least 98% of the proteins are not altered.

In an embodiment of the invention the partially hydrolysed protein has a degree of hydrolysation from 8 to 24%, preferably from 11 to 18%, such as from 13 to 16%.

Partially hydrolysed protein comprises protein where essentially all protein has been hydrolysed to some degree. However, the partially hydrolysed protein may comprise some intact protein, where the peptide bonds in some proteins under hydrolysis is broken. In the context of the present invention, a partially hydrolysed protein hydrolysate comprises at most 10% intact protein, such as at most 5% intact protein, preferably at most 3% intact protein, even more preferably at most 1% intact protein. The term "essentially all" refers to that the main part has been hydrolysed, such as at least 95% of the protein has been hydrolysed preferably at least 98% of the protein has been hydrolysed.

In an embodiment of the invention, the composition, for example an infant formula, may comprise both a partially hydrolysed protein hydrolysate and another protein source which comprises intact protein. For example, the source of protein may comprise both intact protein and partially hydrolysed proteins, such as a for example a whey protein isolate. Further, the composition or infant formula according to the present invention may comprise a partially hydrolysed protein hydrolysate and another protein source, said other protein source comprising intact protein. For example partially hydrolysed whey protein isolate and skim milk protein.

The amount of hydrolysed protein should be at least 50% based on total protein, such as at least 60%, preferably at least 70%, such as at least 80%, even more preferably at least 90%.

Skim milk (may also be called skimmed milk) is a product made from whole milk where essentially all milk fats are removed from the product. In skim milk the amount of fat is from zero to 0.3%. Thus, skim milk will comprise both whey protein and casein.

Another example can be a combination if partially hydrolysed whey protein isolate and whole milk protein.

In an embodiment of the invention, the partially hydrolysed protein is present in an amount of at least 5 g per litre, such as least 7 g per litre, preferably at least 9 g per litre. For example, the protein is present in the composition in an amount of 5 g to 35 g per litre, such as from 8 g to 30 g per litre, preferably 9 to 17 g per litre, or 15 to 30 g per litre.

In a further embodiment of the present invention, the ratio between the partially hydrolysed protein and sn-2 palmitate is from 1.5:1 to 35:1 by weight, such as from 2.0:1 to 30:1, preferably from 2.5:1 to 25:1, even more preferably from 2.5:1 to 15:1, such as from 2.5:1 to 10:1 by weight.

In a further embodiment of the present invention, the ratio between the partially hydrolysed protein and sn-1(3) palmitate is from 2:1 to 20:1 by weight, such as from 2.5:1 to 15:1, preferably from 3:1 to 10:1 by weight.

Calcium:

In an aspect of the present invention, the composition comprises ionic calcium.

The ionic calcium may be any calcium source suitable to be administrated to infants. For example, the ionic calcium may be one or more selected from the group consisting of calcium citrate, calcium hydroxide, calcium oxide, calcium chloride, calcium carbonate, calcium gluconate, calcium phosphate, calcium diphosphate, calcium triphosphate, calcium glycerophosphate, calcium lactate and calcium sulphate.

In a preferred embodiment, the ionic calcium is one or more selected from the group of calcium hydroxide, calcium chloride and calcium citrate. However, the ionic calcium may also be one or more from the group of calcium phosphate, calcium gluconate and calcium carbonate.

In the context of the present invention, ionic calcium refers to calcium which is not attached to proteins. Ionic calcium may also be known as free calcium. Ionic calcium can be measured with a ion meter.

Calcium phosphate as such is not ionic, but a chemical reaction is made under digestion which releases some free calcium. For example calcium diphosphate follows the following solubility equilibrium:

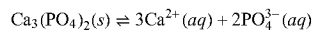

$$Ca_3(PO_4)_2(s) \rightleftharpoons 3Ca^{2+}(aq) + 2PO_4^{3-}(aq)$$

Thus, in the context of the present invention calcium phosphate is considered as a source of ionic calcium In an embodiment of the invention, the composition comprises ionic calcium in an amount of at least 1.7 mmol/L.

The inventors of the present invention has surprisingly found out that ionic calcium in combination with a hydrolysed protein hydrolysate and an oil mix with palmitic acid provides an improved effect on calcium excretion and thus may improve calcium absorption. Without being bound by any theory, the inventors of the present invention believes that ionic calcium provides a significant calcium-peptide interaction with peptides from hydrolysed protein and thus an indirect impact on the different digestive enzyme. The calcium-peptides will cause a poor protection of lipase as compared to intact proteins and to peptides not bound to calcium. Lipase is responsible for the release of sn-1(3) palmitic acids from triacylglycerols under digestion, and less sn-1(3) palmitic acids will be released when having a blend of hydrolysed protein and calcium. This results in less formation of palmitic acid soaps and thus more calcium which can be absorbed.

Further ionic calcium and magnesium are able to form bridges between the negatively charged molecules of proteins and increase drastically the formation of heavy precipitates of whey proteins. These calcium and magnesium bridges form much more easily during the heat denaturation which favours a more flexible open structure of the protein chains.

In a further embodiment of the invention, the composition comprises ionic calcium in an amount of at least 2.0 mmol/l, such as for example at least 2.2 mmol/L, preferably at least 2.5 mmol/L.

In a further embodiment of the present invention, the composition comprises ionic calcium in an amount of 1.7 to 5.0 mmol/L, such as 2.0 to 4.5 mmol/L, preferably 2.5 to 4.2 mmol/L, such as 3.0 to 4.0 mmol/L.

Infant Formula:

In an aspect, the composition according to the invention is an infant formula.

However, in another aspect, the composition according to the invention is a fortifier or supplement to human breast milk or to an infant formula, or the composition is a composition to be used in making up an infant formula.

In the context of the present invention, the term "infant formula" refers to an infant formula comprising the nutrients normally required for infants to obtain a suitable growth and wherein said infant formula comprises proteins, carbohydrates, lipids, vitamins, minerals and trace elements.

The infant formula according to the present invention may be a starter formula for infants from the age of birth to 4 to 6 months and which provide complete nutrition for this age group (both for term and preterm infants). Further, the infant formula may be a follow-on formula for infants between the ages of four to six months and twelve months which are fed to the infants in combination with increasing amounts of the foods, such as infant cereals and puréed fruits, vegetables and other foodstuffs as the process of weaning progresses.

The infant formula according to the present invention comprises a oil mix, wherein said oil mix comprises palmitic acid and wherein the proportion of sn-2 palmitic acid is at least 35% based on total palmitic acid. The amount of sn-1(3) palmitic acid is thus less than 35% by weight of total palmitic acid.

In an embodiment according to the invention, the oil mix comprises sn-2 palmitate in an amount of 2-15% of total fatty acids present in the oil mix and sn-1(3) palmitate in an amount of 5-14% of total fatty acids in the oil mix.

The oil mix may comprise other fatty acids than palmitic acid, mainly these fatty acids are bound to triacylglycerols, but some may be present as free fatty acids. Examples of other fatty acids present is stearic acid and myristic acid which like palmitic acid are saturated acids, monounsaturated fatty acids, such as oleic acid, and polyunsaturated fatty acids, such as linoleic acid, alpha-linolenic acid, arachidonic acid, and docosahexaenoic acid.

In a preferred embodiment, the oil mix comprises stearic acids.

Typically, the infant formula comprises an oil mix in an amount of 20 to 45 g per litre infant formula.

All the features and embodiments relating to the oil mix, palmitic acid, hydrolysed protein and ionic calcium described above in connection with the composition according to the invention also applies to the infant formula.

Thus, in an embodiment, the infant formula comprises an oil mix, wherein the oil mix comprises palmitic acid in an amount of 15 to 25% by weight, such as in an amount of 18 to 22% by weight.

The protein content in the infant formula (term and preterm) is typically between 1.6 to 3.6 g/100 kcal, but may be lower. The protein content in the starter formulas are in the lower range and the protein content of the follow-on formulas being in the upper end of the range.

In a further embodiment, the infant formula comprises proteins in an amount of 5.0 to 35.0 g per litre.

As mentioned earlier, the protein present in the infant formula may not all be hydrolysed protein, but a part of the protein in the infant formula may be another protein source which for example is intact. However, there must be a certain amount of hydrolysed protein present in the infant formula to obtain the desired effect. Thus, the amount of partially hydrolysed proteins in the infant formula is at least 50% of the total amount of protein, such as at least 60% of the total amount of protein, preferably at least 70% of the total amount of protein, even more preferably at least 80% of the total protein. In an embodiment, the protein present in the infant formula is essentially all partially hydrolysed protein.

By the term "essentially all" is meant that a major part, i.e. essentially all protein is partially hydrolysed, for example at least 95% is partially hydrolysed, such as at least 98%.

The infant formula according to the present invention may also comprise a source of carbohydrates. The composition may comprise one or more carbohydrate. The preferred source of carbohydrate is lactose although other carbohydrates such as saccharose, maltodextrin, and starch may also be added. Preferably, the carbohydrate present in the infant formula according to the present invention is between 9 and 14 g/100 kcal. The carbohydrate present in the infant formula is preferably lactose.

The infant formula may also comprise all vitamins and minerals understood to be essential in the daily diet in nutritionally significant amounts. Minimum requirements have been established for certain vitamins and minerals. Examples of minerals, vitamins and other nutrients present in the nutritional composition include vitamin A, vitamin B1, vitamin B2, vitamin B6, vitamin E, vitamin K, vitamin C, vitamin D, folic acid, inositol, niacin, biotin, pantothenic acid, choline, calcium, phosphor, iodine, iron, magnesium, copper, zinc, manganese, chloride, potassium, sodium, selenium, chromium, molybdenum, taurine, and L-carnitine. The minerals are usually added in the salt form.

Other components may be added to an infant formula, such as probiotics, prebiotics, emulsifiers and stabilizers.

Preparation:

The composition and infant formula according to the present invention may be prepared by any known or otherwise suitable manner. For example, an infant formula may be proposed by blending together a source of protein with a carbohydrate source and a lipid source in appropriate proportions. If used, emulsifiers may be included at this stage. Vitamins and minerals may be added at this stage, but may also be added later to avoid thermal degradation. Water, preferably water which has been subjected to reverse osmosis or deionized water, may then be added and mixed in to form a liquid mixture. The temperature of mixing is preferably room temperature, but may also be higher. The liquid mixture may then be thermally treated to reduce bacterial loads. The mixture may then be homogenized.

If it is desired to produce a powdered composition, the homogenized mixture is dried in a suitable drying apparatus, such as a spray drier or freeze drier and converted into powder.

Processes used in the manufacture of formulae for infants and young children are based on the concept that the products must be nutritionally adequate and microbiologically safe to consume. Thus, steps that eliminate or restrict microbiological growth are central to production processes. The processing technology for each specific formula is proprietary to the manufacturer but, in general, it involves the preservation of an oil-in-water (o/w) emulsion by dehydration in the case of powder products or, sterilization in the case of ready-to-feed or concentrated liquid products. Powdered infant formula may be produced using various processes, such as dry blending dehydrated ingredients to constitute a uniform formula or hydrating and wet-mixing a mixture of macro-ingredients, such as fat, protein and carbohydrate ingredients and then evaporating and spray drying the resultant mixture. A combination of the two processes described above may be used where a base powder is first produced by wet-mixing and spray drying all or some of the macro-ingredients and then dry blending the remaining ingredients, including carbohydrate, minerals and vitamins and other micronutrients, to create a final formula. Liquid formulae are available in a ready-to-feed format or as a concentrated liquid, which requires dilution, normally 1:1, with water. The manufacturing processes used for these products are similar to those used in the manufacture of recombined milk.

If it is desired to produce a liquid infant formula, the homogenized mixture is filled into suitable containers, preferably aseptically. However, the liquid composition may also be retorted in the container, suitable apparatus for carrying out the filling and retorting of this nature is commercially available.

Use of the Composition/Infant Formula:

The present invention is also directed to the composition or infant formula according to the present invention for use in administration to an infant or young child to reduce calcium excretion by said infant or young child. The composition or infant formulation is administered to the infant by feeding the infant.

The infant could be any infant, i.e. both a term and preterm infant. The composition or infant formula according to the invention may advantageously be administered to infants or young children. In a particular embodiment, it is used for infants of less than 12 months, i.e. less than 6 months or less than 3 months. In one embodiment, the composition or infant formula is a preterm infant formula. In another embodiment, the composition or infant formula is designed for consumption by infants from birth to 12 months.

The products of the invention can be in a fluid (liquid) form. These can be sold ready to consume (without further dilution).

The products of the invention can be in the form of dehydrated powders which are prepared for consumption by reconstitution with water or milk.

The products of the invention can also be in the form of extruded snack product, especially intended for young children.

Further, the present invention is directed to the composition or infant formula according to the present invention for use in administration to an infant or young child to improve calcium homeostasis, increase calcium absorption, increase calcium retention, increase calcium utilization and/or reduce the formation of insoluble palmitic acid soaps.

Without being bound by theory, the increased calcium absorption is thought to have a beneficial physiological effect as well as an effect on bone mineralisation. The inventors of the present invention has surprisingly found out that when using ionic calcium in combination with hydrolysed proteins and an oil mix comprising palmitic acid for use in infant formulation, a synergistic effect is obtained and calcium is more efficiently absorbed than when using a composition comprising an oil mix with palmitic acid either with intact proteins or in combination with hydrolysed proteins. The hydrolysed proteins are without being bound by any theory believed to influence the effect of pancreatic lipase which releases palmitic acids from the sn-1 and sn-3 (alpha) position of triacylglycerols. Thus, when hydrolysed proteins are present, less sn-1(3) palmitic acid is released from the triacylglycerols and thus less free palmitic acids available to form soaps with calcium. Reduced palmitic acid soaps may lead to reduced constipation and improved gastrointestinal tolerance as compared to a standard infant formula. Hence, when less calcium is excreted, more calcium may be absorbed.

Further, ionic calcium in combination with hydrolysed proteins further decreases the effect of lipase, since calcium forms bonds with peptides from the hydrolysed proteins. Thus, hydrolysed proteins and ionic calcium provides a synergistic effect such that less palmitic acid in sn-1 and sn-3 position of triacylglycerols is released.

Thus, when hydrolysed proteins and ionic calcium are present, it will result in less sn-2 palmitic acid released and thus less free palmitic acids released which can bind to free calcium. Therefore, less palmitic acid soaps are formed. Reduced palmitic acid soaps may lead to reduced constipation and improved gastrointestinal tolerance as compared to a standard infant formula. Hence, when less calcium is excreted, more calcium is absorbed.

Similar effect on calcium excretion can be obtained with a formula comprising an oil mix comprising palmitic acid, hydrolysed proteins and ionic calcium which is similar to the calcium excretion obtained with human milk.

The present invention is also directed to a composition or infant formulation according to the invention for use in administration to an infant or young child to soften stools, prevent and/or reduce the risk of hard stools, digestive discomfort from hard stools, prevent and/or reduce the risk of constipation, decrease the frequency and duration of crying and fussing, and alleviate digestive discomfort and colic. A reduction in digestive discomfort can improve infant sleep duration, improve sleep quality and quantity, improve infant and parental quality of life and reduce maternal anxiety.

Increased calcium absorption and retention can lead to increased bone mineralization. Increased calcium absorption is due to less formation of calcium soaps which are poorly absorbed, but on the contrary excreted. These palmitic acid soaps (calcium-fatty acid complexes) when excreted in the stool may cause the stool to be hard stool. Thus, an object of the present invention is also softening of stools.

Furthermore, an aspect of the present invention relates to the composition or infant formula according to the present invention for use in administration to an infant or young child to increase bone mineralization, increase bone strength, and increase bone mineral density.

Especially, for preterm infants or low or very low birth weight infants have a high incidence of metabolic bone disease, 30-50%, and there are therefore at need to increase bone mineralization in this type of infants. Metabolic bone disease increases the risk of fractures and growth failure. Inadequate calcium absorption is believed to be a main factor in metabolic bone disease.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

The following examples illustrates the specific embodiments of the composition and infant formula according to the invention and the use of said composition and infant formula. The examples are given solely for the purpose of illustration and are not to be construed as limitations if the present invention, as many variations thereof are possible without departing form the spirit of the invention.

Example 1

Example 1 describes a comparison of different studies conducted to study infants being fed with different infant formulas compared to a control infant formula In group I, infants are fed with an infant formula comprising intact proteins and a fat blend comprising triacylglycerols with 35.9% of palmitic acid in the sn-2 position of triacylglycerol. The infants were fed with said infant formula for four weeks and then palmitate soaps (calcium-palmitate complexes), total fatty acid soaps and calcium in the stool were measured and compared to the amounts in a control infant formula.

In group II, infants, as in group I, are fed with an infant formula comprising intact proteins and a fat blend comprising triacylglycerols, with 35.9% of palmitic acid in sn-2 position of triacylglycerol. The infants were fed with said infant formula for eight weeks and then palmitate soaps (calcium-palmitate complexes), total fatty acid soaps and calcium in the stool were measured and compared to the amounts in a control infant formula.

In group III, infants are fed with an infant formula comprising partially hydrolysed protein and a fat blend comprising triacylglycerols with 35.9% of palmitic acid in sn-2 position of triacylglycerol. The infants were fed with said infant formula for eight weeks and then palmitate soaps (calcium-palmitate complexes), total fatty acid soaps and calcium in the stool were measured and compared to the amounts in a control infant formula.

The control infant formula comprises a fat blend having beta palmitic acid in an amount of about 11.7%. Further, the control formula comprises a standard intact cow's milk protein as the protein source.

The calcium content in stool is also measured for a group of infants fed with human milk.

The primary objective of the studies was to measure the amount of calcium and calcium-fatty acid soaps in the stool of infants fed with the different infant formulas as compared to a control infant formula.

Both the three test formulas (in group I, II, and III) and the control formula was prepared as a ready-to-feed liquid. The three test formulas and the control formula are described below in table 1A.

TABLE 1A

| | Test formula in group I | Test formula in Group II | Test formula in group III | Control formula |
|---|---|---|---|---|
| Amount palmitic acid in oil mix | 8.2 g/L 22.8% | 8.2 g/L 22.8% | 8.2 g/L 22.8% | 7.5 g/L 21.3% |
| Amount sn-2 palmitate of total palmitic acid | 35.9% | 35.9% | 35.9% | 11.7% |
| Amount sn-2 palmitate (% of total fat) | 8.2% | 8.2% | 8.2%6 | 2.6% |
| Amount Sn-1(3) palmitate (% of total fat) | 14.6% | 14.6% | 14.6% | 18.8% |

The ionic calcium content in group III and the control group is shown in the below table 1B:

| | Ionic calcium (mmol/L) |
|---|---|
| Control | 1.09 |
| Test formula | 3.65 |

The calcium excreted in the stools were measured for the three groups and in the control formula.

Table 2 below shows the calcium stool content measured in the faeces of infants in group I, II and III. Further, table 2 shows the calcium stool content in infants fed with the control and in infants fed with human breast milk. Table 2 furthermore shows the calcium content in the different infant formulas

TABLE 2

| | Group I infant formula vs. control | | | Group II infant formula vs. control | | | Group III infant formula vs. control | | |
|---|---|---|---|---|---|---|---|---|---|
| Stool Calcium (% change) | ↑ 3.7% NS | | | ↓ 5.2% NS | | | ↓ 20.5% (p < 0.05) | | |
| | Test | Ctrl | HM | Test | Ctrl | HM | Test | Ctrl | ND |
| Stool calcium (mean mg/g | 39.4 | 38 | 17.6 | 30.7 | 32.4 | 20.3 | 25.6 | 32.3 | |

TABLE 2-continued

| | Group I infant formula vs. control | | | Group II infant formula vs. control | | | Group III infant formula vs. control | | |
|---|---|---|---|---|---|---|---|---|---|
| | Test | Ctrl | HM | Test | Ctrl | HM | Test | Ctrl | ND |
| Calcium content in test formula (mg/100 ml) | 42 | 42 | NA | 46 | 47 | NA | 46 | 47 | |

NS = not significant;
ND = not done;
NA = not applicable

From table 2 it can be seen that the calcium content in the test formulas and control formulas are almost similar, i.e. no significant difference. Furthermore, table 2 shows that the infants fed the test formula in group III have a faecal calcium content more similar infants fed with human breast milk than infants fed test formula in group I and II. Thus, infants fed with an infant formula comprising moderate amounts of beta palmitic acid and partially hydrolysed proteins has a content of calcium excreted in stools more similar to infants fed with human breast milk as compared to infants fed with infant formulas with a high amount of beta palmitic acid and intact proteins.

Besides from the calcium content excreted in the stools, the fatty acid soaps were also measured for the three groups. The content of calcium in stools and the fatty acid soaps were measured and compared to the contents in the control formula. The data can be seen in table 3.

TABLE 3

| | Group I infant formula vs. control | Group II infant formula vs. control | Group III infant formula vs. control |
|---|---|---|---|
| Palmitate soaps | ↓ 15% (p = 0.0028) | ↓ 36% (p < 0.0001) | ↓ 41% (p < 0.0001) |
| Total fatty acid soaps | ↓ 8% (NS) | ↓ 40% (p = 0.0001) | ↓ 28% (p < 0.01) |
| Calcium in stool | ↑ 3.7% (NS) | ↓ 5.2% (NS) | ↓ 20.5% (p < 0.05) |

↓: refers to a reduction as compared to the control.
↑: refers to an increase as compared to the control.

The infants in the test groups are fed with the test infant formulas as the sole nutrition.

From table 3, it is shown that the infant formula comprising a combination of beta palmitic acid (35.9%) and hydrolysed protein has an improved effect on reducing the amount of palmitic acid-calcium complexes (soaps) as compared to infants fed with an infant formula comprising palmitic acid in an amount of 35.9 and intact proteins. Thus, it is shown that hydrolysed proteins have an effect on calcium excretion in stools when administered with beta palmitic acid in moderate amounts. The calcium excretion for the infants in group III was reduced by 20% as compared to infants fed with the control infant formula, while there was no significant difference in the calcium excretion for the infants in group I and II. Further, the faecal calcium content for the infants fed in group III was closer to the faecal calcium content in infants fed with human breast milk.

The invention claimed is:

1. A composition for use in formulas for infants or young children, the composition comprising (1) partially hydrolysed protein, (2) ionic calcium and (3) an oil mix comprising palmitic acid esterified to triacylglycerols, wherein the palmitic acid comprises palmitic acid esterified in the sn-2 position of triacylglycerols ("the sn-2 palmitic acid") in an amount of at least 20% by weight of total palmitic acid, wherein the ratio between the partially hydrolysed protein and the sn-2 palmitic acid is from 1.5:1 to 35:1 based on weight, and wherein the oil mix comprises the sn-2 palmitic acid in an amount of 18 to 22% by weight of the oil mix.

2. The composition according to claim 1, wherein the ionic calcium is selected from the group consisting of calcium citrate, calcium hydroxide, calcium oxide, calcium chloride, calcium carbonate, calcium gluconate, calcium phosphate, calcium diphosphate, calcium triphosphate, calcium glycerophosphate, calcium lactate, calcium sulphate, and mixtures thereof.

3. The composition according to claim 1, wherein the composition comprises the ionic calcium in an amount of at least 1.7 mmol/L of the composition.

4. The composition according to claim 1, wherein the partially hydrolysed protein is partially hydrolysed whey protein.

5. The composition according to claim 1, wherein the partially hydrolysed protein has a degree of hydrolysation from 8% to 24%.

6. The composition according to claim 1, wherein the ratio between the partially hydrolysed protein and the sn-2 palmitic acid is from 2.0:1 to 30:1 based on weight.

7. The composition according to claim 1, wherein the amount of the partially hydrolysed protein is at least 50% of the total amount of protein.

8. The composition according to claim 1, wherein the ratio between the partially hydrolysed protein and the sn-2 palmitic acid is from 2.5:1 to 25:1 based on weight.

9. The composition according to claim 1, wherein the ratio between the partially hydrolysed protein and the sn-2 palmitic acid is from 2.5:1 to 15:1 based on weight.

10. The composition according to claim 1, wherein the ratio between the partially hydrolysed protein and the sn-2 palmitic acid is from 2.5:1 to 10:1 based on weight.

11. The composition according to claim 1, wherein the palmitic acid comprises the sn-2 palmitic acid in an amount from 20% to 80% by weight of total palmitic acid.

12. The composition according to claim 1, wherein the palmitic acid comprises the sn-2 palmitic acid in an amount from 25% to 75% by weight of total palmitic acid.

13. The composition according to claim 1, wherein the palmitic acid comprises the sn-2 palmitic acid in an amount from 30% to 70% by weight of total palmitic acid.

14. The composition according to claim 1, wherein the palmitic acid comprises the sn-2 palmitic acid in an amount from 35% to 65% by weight of total palmitic acid.

15. The composition according to claim 1, wherein the oil mix comprises the palmitic acid in an amount of at least 10% by weight of the total amount of fatty acids.

16. The composition according to claim 1, wherein the oil mix comprises the palmitic acid in an amount of at least 12% by weight of the total amount of fatty acids.

17. The composition according to claim 1, wherein the oil mix comprises the palmitic acid in an amount of at least 15% by weight of the total amount of fatty acids.

18. The composition according to claim 1, wherein the oil mix comprises the palmitic acid in an amount of at least 18% by weight of the total amount of fatty acids.

19. The composition according to claim 1, wherein the oil mix comprises the palmitic acid in an amount of at least 8% by weight of the total amount of fatty acids.

* * * * *